(No Model.)
J. F. GORDON.
Mechanical Movement.
No. 237,266. Patented Feb. 1, 1881.
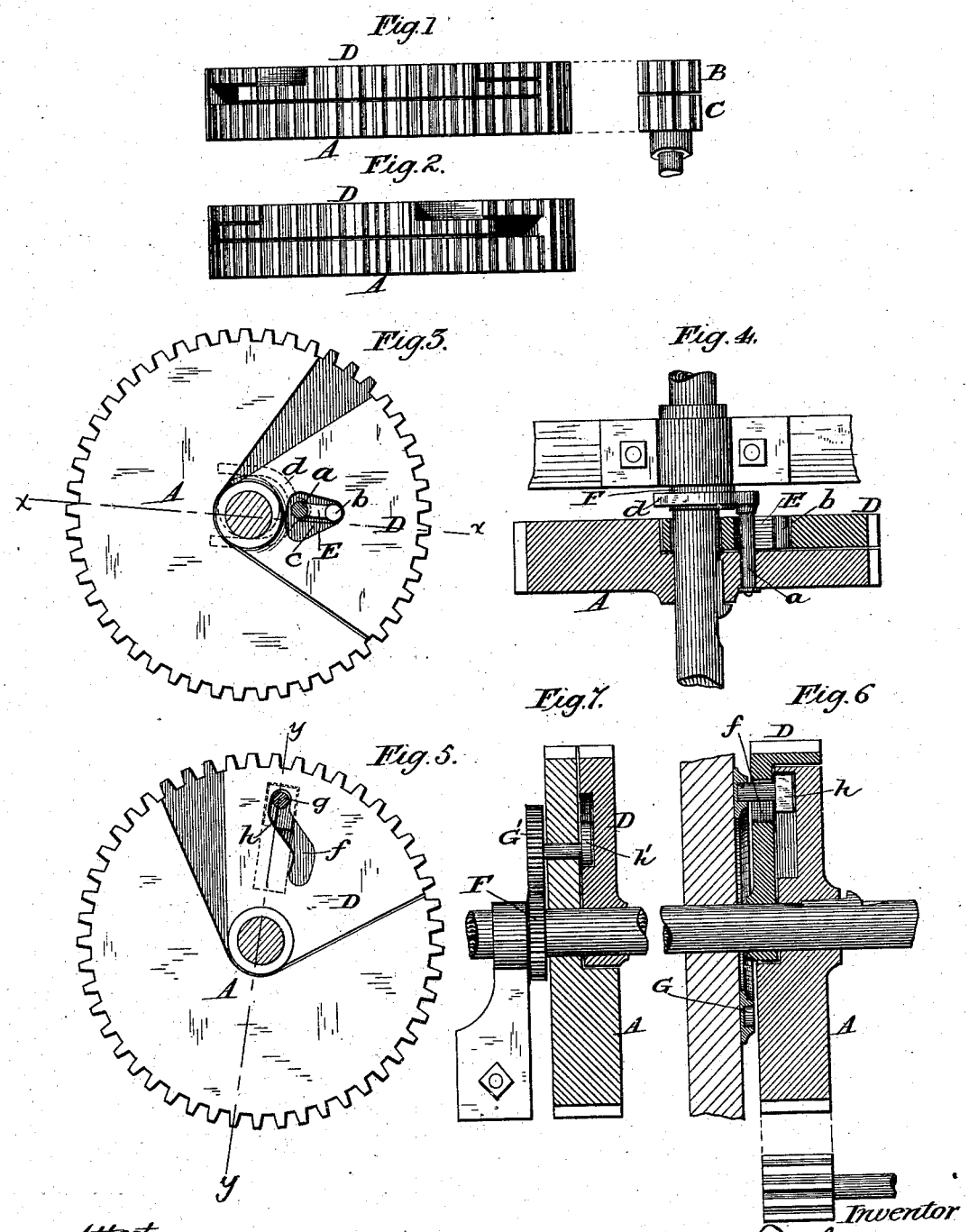

UNITED STATES PATENT OFFICE.

JAMES F. GORDON, OF ROCHESTER, NEW YORK.

MECHANICAL MOVEMENT.

SPECIFICATION forming part of Letters Patent No. 237,266, dated February 1, 1881.

Application filed December 4, 1880. (No model.)

*To all whom it may concern:*

Be it known that I, JAMES F. GORDON, of Rochester, in the county of Monroe and State of New York, have invented certain Improvements in Mechanical Movements, of which the following is a specification.

The object of my invention is to transmit to a pinion from a continuously-revolving gear-wheel an intermittent rotary motion or a continuous rotation of varying speed, or to impart differential motions to two pinions; and to this end the invention consists, mainly, in a gear-wheel having a portion of its periphery made movable forward and backward in relation to the remainder of the wheel, and in combining with said wheel automatic devices to adjust the movable section when the wheel is in motion. By causing the movable section while in action to move faster or slower than the remainder of the wheel the driven pinion will have its speed increased or diminished or its motion entirely arrested at any desired point during the rotation of the gear-wheel.

My invention may be embodied in various forms, and the mechanism for shifting the movable section may be constructed and arranged in any suitable manner.

The accompanying drawings represent forms of construction which are considered the best for general use.

Figure 1 represents an edge view of my sectional driving-gear, adapted to drive two concentric pinions and give one a movement differing from that of the other, the movable section being shown in its forward position. Fig. 2 is a similar view of the gear with the movable section in its backward position. Fig. 3 is a side or face view of the gear and the mechanism by which the movable section is adjusted. Fig. 4 is a vertical cross-section of the same on the line *x x*, Fig. 3. Fig. 5 is a face view of a gear-wheel constructed to drive a single pinion. Fig. 6 is a central cross-section of the same on the line *y y*, Fig. 5. Fig. 7 is a view of a modification of the device.

A represents my improved driving-wheel, provided with ordinary gear-teeth upon the periphery, and made of suitable width to act upon and drive two concentric pinions, B C, placed side by side.

D represents the movable section, seated in a recess in the side of the wheel and forming a part of the same. It is made in the form of a sector, and swings to a limited extent upon and around the shaft of the wheel. It embraces, according to the requirements of the case, a greater or less number of cogs upon its periphery, and is made of but half the width or thickness of the wheel, so that its teeth act upon only one of the pinions B.

It will be seen that when the wheel is set in motion it acts upon and drives both pinions, the section D moving with the remainder of the wheel and acting upon the pinion B to turn the same. If the section moves constantly with the wheel and maintains an unchanging relation thereto, the two pinions will be driven alike; but if the section is caused to move forward or backward in relation to the wheel while acting upon pinion B, the latter will receive a motion differing from that of pinion C. To effect this movement automatically I pivot to the wheel at *a* a dog or lever, E, having an arm, *b*, which bears in a slot, *c*, in the movable section, and having also a second and forked arm, *d*, which straddles a stationary collar or cam, F, arranged eccentrically to the wheel, as shown in Figs. 3 and 4. The rotation of the wheel carries the dog or lever around the eccentric, which vibrates the lever and causes the same to move the section forward and back during each revolution of the wheel. The eccentric or cam is so arranged as to cause the movement of the section during the time that the latter is acting upon pinion B, and then return the section to its normal position before it again acts upon the pinion.

The eccentric may be adjusted to advance the section during action faster than the wheel, in which case the pinion B will gain upon pinion C; or the adjustment may be such that the section, when in action, will move slower than the wheel, or stop momentarily, in which event pinion C will gain on pinion B.

The above-described wheel is designed, as above stated, to give differential motion to two pinions. The same mode of construction as regards the movable section may be used in wheels designed to drive a single pinion only with an intermittent or variable movement without changing the speed of the prime motor, as represented in Figs. 5 and 6. The gear therein shown is of the same width as the pinion to be driven, and the movable section is of the full width or thickness of the wheel at the edge. As a means of moving this section it is provided with an oblique slot, *f*, which receives a stud, *g*, on a slide, *h*, which is mounted in a radial slot in the body of the wheel, so that as the stud is moved radially to and fro it moves the section forward and backward. The movement of the stud is produced by means of a fixed slotted cam-plate, G, in which the end of the stud travels, as shown in Fig. 5.

In order that there may be no danger of the pinion disengaging or failing to mesh when passing upon and from the ends of the movable section, the ends may be halved and lapped upon the remaining portion of the wheel, as shown in Figs. 1 and 2. This feature is the same in construction and effect as the lapped ends of the racks described in the patent granted to me September 21, 1880, No. 232,486.

While it is preferred that the movable section shall be adjusted positively in both directions, it may be returned by a spring.

Another mode of operating the movable section of the gear-wheel is to have a stationary gear-wheel surrounding the hub of the rotary wheel, with a third gear-wheel of the same size of said stationary gear-wheel and gearing into it, said third gear-wheel being journaled in the rotary wheel and having a cam on its shaft acting upon the movable section, as represented in Fig. 7, in which A represents the main gear-wheel; D, the movable section; F, the fixed gear; G', the third gear, and *h'* the eccentric or cam.

It will be observed that in each and all of the arrangements shown in the drawings the wheel A is the prime mover, and that the part or section D receives its rotary motion from wheel A through the intermediate devices or connections, the part D receiving the same motion as wheel A, except as the motion is modified by the intermediate parts.

In some cases it may be desirable to have the movable gear-section make both its forward and backward movements during the time that it is acting upon the pinion. This may be effected by simply adjusting the eccentric, cam, or other operating device to act at the required times.

The form of the movable section, the manner of connecting and sustaining it, and the construction of the devices for moving it are all matters of secondary importance, and may be changed in many respects which will suggest themselves to the skilled mechanic without departing from the limits of my invention.

It is to be noted that the slotted cam-plates and the eccentric (shown in the different figures) are mere equivalents of each other, and that, as they all surround the main axis and are all eccentric thereto, they are in fact substantially one and the same thing.

Having thus described my invention, what I claim is—

1. A gear-wheel having a section or portion of its periphery movable forward and backward in relation to the remainder, substantially as described and shown.

2. A gear-wheel having a portion of its teeth movable in relation to the remainder, in combination with automatic devices, substantially as shown, to advance or retard the movable teeth when they are in action.

3. In combination with a pinion, a continuously-moving driving-wheel provided with movable or shifting teeth, and automatic devices to advance or retard said teeth in relation to the other teeth while they are acting upon the pinion.

4. In combination with two pinions, a driving-wheel having a face of suitable width to drive both pinions, and having one side recessed and provided with an automatically-shifting section, the teeth of which act only upon one of the pinions, substantially as and for the purpose described.

5. A gear-wheel having part of its teeth upon a movable section, in combination with means attached to the wheel for moving the section and an independent fixed device arranged to encounter and operate the devices which move the section.

6. A gear-wheel having a movable toothed section, substantially as described, devices for moving said section relatively to the remainder of the wheel, and a fixed cam or eccentric arranged to operate said devices.

7. In combination with the recessed gear-wheel, the movable toothed section arranged to swing upon an axis concentric with that of the wheel.

8. The combination of the wheel and its slotted movable section, the slide and stud, and the cam engaging with the stud.

9. In combination with the recessed gear-wheel, the movable toothed section having both ends halved and seated therein, as shown, so that a continuous series of teeth exists at all times entirely around the wheel.

10. The combination of two pinions, a series of revolving gear-teeth which act always in the same direction upon one of said pinions, a second series of revolving teeth which act upon the second pinion, and automatic devices which transmit the rotary motion from the first to the second series of teeth and change their relative speeds at intervals, substantially as described and shown.

JAMES F. GORDON.

Witnesses:
S. McK. SMITH,
C. D. KICHEL.